United States Patent [19]
Whitehouse

[11] 3,990,938
[45] Nov. 9, 1976

[54] RECOVERY OF POLYMER FROM SOLUTION

[75] Inventor: Wendell Gaylon Whitehouse, Pittsfield, Mass.

[73] Assignee: General Electric Company, Pittsfield, Mass.

[22] Filed: Oct. 10, 1974

[21] Appl. No.: 513,897

Related U.S. Application Data

[63] Continuation of Ser. No. 163,504, July 16, 1971, abandoned, which is a continuation of Ser. No. 821,223, May 2, 1969, abandoned.

[52] U.S. Cl. .............................. 159/4 J; 159/16 R; 159/DIG. 10; 202/236
[51] Int. Cl.² ...................... B01D 1/16; B01D 1/14; B01D 3/08
[58] Field of Search .................... 159/4 B, 4 J, 16 S, 159/48 L, 48 R, DIG. 10, 16 R, 16 A; 239/4, 18, 422, 424.5; 203/49, 95; 202/185 R, 234, 236

[56] References Cited
UNITED STATES PATENTS

| | | | |
|---|---|---|---|
| 1,324,866 | 12/1919 | Wilcox | 239/424.5 |
| 2,592,814 | 4/1952 | Ludlow | 159/4 I |
| 2,959,561 | 11/1960 | Kelley | 159/4 J |
| 3,004,719 | 10/1961 | Pouppirt, Jr. | 239/422 X |
| 3,168,131 | 2/1965 | Gross | 239/424.5 X |

*Primary Examiner*—Jack Sofer
*Attorney, Agent, or Firm*—Donald M. Papuga; William F. Mufatti

[57] ABSTRACT

This disclosure is for a solvent flashing process for recovering polymer from dilute solution in discrete, uniform granules substantially free of solvent. The process comprises pressurizing a dilute solution of a polymer dissolved in a solvent, preferably at an elevated temperature, spraying the solution through a first fluid atomizing outlet of a two fluid nozzle, and forcing a hot gas through at least one outlet port of the two fluid nozzle directed so as to intersect with the polymer solution emerging from the nozzle. The solution is atomized into fine droplets from which the bulk of the solvent flashes by both passage through the atomizing nozzle and by a shearing of the solution by the hot gas leaving finely divided granules of polymer which are collected in water. The process is characterized by the use of the two fluid nozzle and by the passage of the hot gas through the nozzle which causes further atomizing of the polymer solution with more efficient heat transfer from the gas to the polymer solution. In a preferred embodiment of this invention, the nozzle is maintained below the surface of the water, the polymer solution is a polyphenylene ether solution, preferably a poly-(2,6-diphenyl-1,4-phenylene) ether in benzene, and the hot gas is steam.

2 Claims, 2 Drawing Figures

RECOVERY OF POLYMER FROM SOLUTION

This is a continuation of application Ser. No. 163,504, filed July 16, 1971, which is a continuation of Ser. No. 821,223 filed May 2, 1969, both abandoned.

BACKGROUND OF THE INVENTION

1. Field of the Invention

This invention relates to a spray drying process for recovering polymer from its solution and more particularly, to a process for separating a polymer from solution by flashing the solution in a heated atmosphere.

2. Description of the Prior Art

In many methods for preparing normally solid thermoplastic polymers, solvents which are inert and liquid under contacting conditions are employed to facilitate the polymerization reaction and aid in subsequent purification steps such as monomer recovery and catalyst removal. In such processes, the solvent must be removed with any other vaporizable material in order to recover the solid polymer in a usable form. Residual amounts (often as low as 1%) of light components in the polymer will vaporize upon heating, as in injection molding, thus forming both bubbles and cavities in the finished product. For many applications of such polymeric material, the allowable limits of vaporizable components is less than about 1% and often is less than 0.1%.

The separation of solvent from the polymer presents several problems, particularly when the polymer concentration is initially low, for example, 10 weight percent or less. Vaporization processes are hampered because the viscous nature of the polymer solution reduces heat transfer and can cause considerable foaming as the polymer concentration increases. One method of producing a polymer with less than 1 weight percent residual solvent is by flashing the polymer solution under such conditions that a substantial portion of the solvent is vaporized and a solid polymer is precipitated; however, quite often with commercially available spray drying equipment, this solid polymer is a highly expanded cellular material having a bulk density which may be as low as one pound per cubic foot. This light material is difficult to handle in subsequent operations and it cannot readily be fed to extrusion apparatus at a satisfactory rate because of its low bulk density. Remelting this material is extremely difficult because its insulating effect is such that decomposition temperatures may be reached in some regions before other parts of the material become soft.

A typical flashing procedure is disclosed in U.S. Pat. No. 2,964,513. The process of this patent is particularly adapted to the recovery of polyolefins. According to the invention of this patent, a solid polymer product is formed by dispersing a relatively dilute polymer solution in a flashing zone wherein contact is made with a hot inert gas so that the polymer is heated above its melting point but below the temperature at which the polymer would become fluid. Gases which may be used in the process include nitrogen, carbon dioxide, stack gases, vapors of hydrocarbon, and steam. According to the process, polymer solution is fed to a flash chamber through a nozzle which disperses the solution into droplets. The dispersed solution is immediately contacted with the hot inert gas which strips solvent and light waxes from the solution and causes the polymer to precipitate as a solid. Vapors are collected and condensed in a condenser and subsequently purified to remove the low molecular weight polymer and waxes. Precipitated polymer in contact with the hot gas is heated to a temperature above its melting point and densifies it as it continues to fall to the bottom of the flash chamber. As the polymer particles fall into the lower section of the chamber, they are contacted with low temperature steam and cooled to a temperature below their softening point. The densified polymer is then processed in an extruder wherein substantially all of the residual solvent is said to be removed. This procedure is not applicable to polymers having high melting points such as the aryl substituted polyphenylene ethers.

Another procedure for recovering polymer from solution is disclosed in my U.S. Pat. No. 3,241,600. In this patent, a process is disclosed including pre-heating of a polymer solution (especially that of an elastomeric polymer) to a temperature above the boiling point of the solvent while maintaining it under sufficient pressure to keep the solvent in a liquid condition. The solution, thus superheated and pressurized, is passed through an atomizing nozzle from which the solution emerges as an extremely finely divided spray into a chamber maintained at a lower pressure than the superheated solution, typically maintained at substantially atmospheric pressure, with the result that the bulk of the solvent immediately flashes off, leaving the particles of solid polymer behind. The process is carried out above the surface of water maintained at an elevated temperature. The particles, still containing some solvent, fall into the water and a certain amount of agglomeration of the particles takes place. The particles are then recovered from the water by a process such as filtration.

STATEMENT OF THE INVENTION

The process described herein is an improvement over prior art procedures in that it is low in cost, efficient and polymer particles recovered from solution are discrete, dense and substantially solvent free. The process comprises pressurizing a dilute solution of polymer dissolved in a solvent, preferably at an elevated temperature, spraying the solution through one fluid atomizing orifice of a two fluid nozzle, forcing a hot gas through at least one outlet port of the two fluid nozzle directed to intersect with the polymer solution emerging from the nozzle, whereby the solution is atomized into fine droplets from which the bulk of the solvent flashes by both passage through the atomizing nozzle and by a shearing of the solution by the hot gas thereby forming granules of the polymer, and collecting the granules in water. The process is characterized by the use of the two fluid nozzle and the shearing and heat transfer caused by the hot gases contacting the polymer solution as it emerges from the atomizing nozzle. In a preferred embodiment, the two fluid nozzle is maintained below the surface of hot water in a flashing chamber, the polymer is a polyphenylene ether, most preferably a poly-(2,6-diphenyl-1,4-phenylene) ether, and the hot gas is low pressure steam.

DESCRIPTION OF THE PREFERRED EMBODIMENTS

Figure 1:
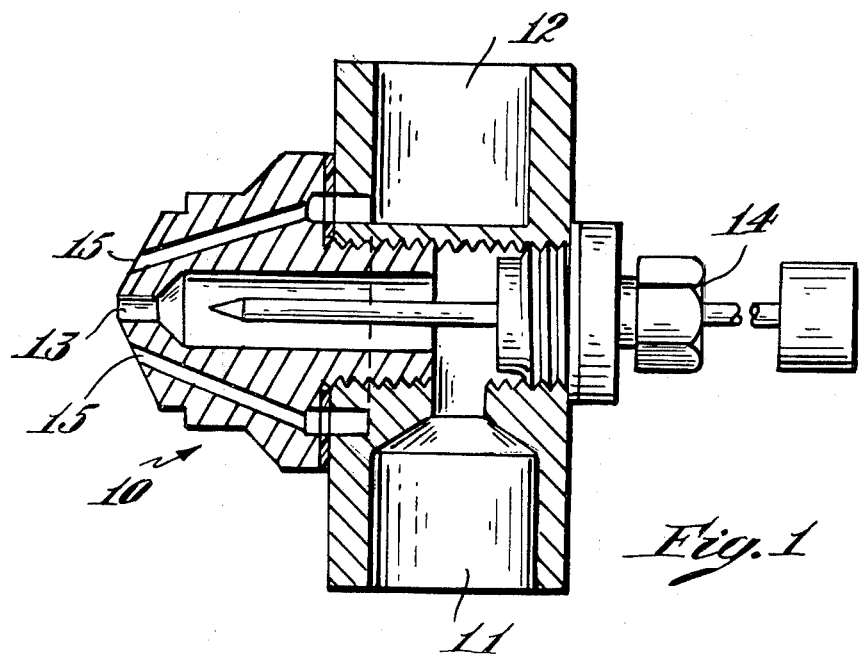
FIG. 1 is a sectional view of a two fluid nozzle used in accordance with this invention.

The process of this invention can be usefully applied to the recovery from solution of any normally solid, water insoluble thermoplastic such as polystyrene, polybutadiene and the like. It is, however, of particular advantage in a polymer recovery process for polymers having a high melting point such as the polyphenylene ethers, especially the polyphenylene ethers having aromatic substitution. Polymers of this nature are described in U.S. Pat. Nos. 3,306,874 and 3,306,875. In a preferred embodiment, they have repeating structural units conforming to the following formula:

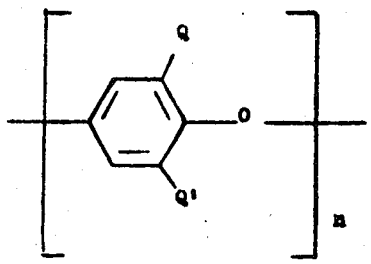

where the oxygen ether atom of one repeating unit is connected to the benzene nucleus of the next adjoining unit; $n$ is a positive integer equal to at least 100; and each of Q and Q' are monovalent substituents selected from the group consisting of hydrogen, halogen, hydrocarbon radicals free of a tertiary alpha carbon atom, halohydrocarbon radicals having at least two carbon atoms between the halogen atom and phenyl nucleus and being free of a tertiary alpha carbon, hydrocarbonoxy radicals being free of a tertiary alpha carbon atom, and halohydrocarbonoxy radicals having at least two carbon atoms between the halogen atom and phenyl nucleus and being free of a tertiary alpha carbon atom. Examples of polyphenylene ethers conforming to the above formula include poly-(2,6-dimethyl-1,4-phenylene) ether, poly-(2,6-diethyl-1,4-phenylene) ether, poly-(2-methyl-6-phenyl-1,4-phenylene) ether, poly-(2-methyl-6-butyl-1,4-phenylene) ether, poly-(2,6-diallyl-1,4-phenylene) ether, poly-(2-butyl-6-allyl-1,4-phenylene) ether, poly-(2,6-ditolyl-1,4-phenylene) ether, poly-(2,6-diphenyl-1,4-phenylene) ether, poly-(2,6-dibutyl-1,4-phenylene) ether, poly-(2-butyl-6-phenyl-1,4-phenylene) ether, poly-(2-chloro-6-methyl-1,4-phenylene) ether, and poly-(2-bromo-6-phenyl-1,4-phenylene) ether. The preferred polyphenylene ethers are those where Q and Q' are aryl and most preferably phenyl.

The polyphenylene ethers are formed by an oxidative coupling reaction of a monovalent phenolic precursor in an organic solvent containing a catalyst complex formed from an amine and a copper salt. Examples of suitable amines and copper salts are disclosed in the above-noted U.S. Pat. Nos. 3,306,874 and 3,306,875 as well as in copending U.S. patent applications Ser. Nos. 807,076 and 807,126, filed Mar. 13, 1969, also incorporated herein by reference. Following the polymerization reaction, the reactor effluent contains a solution of polymer and unreacted monomer in solution, catalyst and other additives such as promoters and the like. Solids are removed using standard procedures such as filtration, and if desired, the polymer solution may be purified such as by passage through a column of an ion exchange resin to remove catalyst residue. The polymer available for recovery is contained in dilute solution and is associated with minor quantities of impurities. The term "dilute" as used in accordance with this description is intended to mean solutions containing a maximum of 20 per cent by weight solids and preferably, 10 per cent by weight solids. Preferred solvents for the polyphenylene ethers in accordance with the invention are those that are insoluble in water. The most preferred solvents are the organic aromatic solvents having a boiling point at least 3° C. below the boiling point of water, benzene being the most preferred solvent.

The recovery of polymer as discrete, substantially solvent-free granules in accordance with the process is believed to be due in part to the use of a two fluid nozzle, one embodiment of which is shown in section in FIG. 1 of the drawings. As disclosed therein, the nozzle 10 comprises inlet 11 for polymer solution and inlet 12 for hot gas. The polymer solution, heated to an elevated temperature and maintained under pressure flows into inlet 11 and is atomized by passage through a first fluid atomizing orifice 13 which may have a diameter of from 0.0625 to 0.125 inches. The flow of polymer solution through orifice 13 is regulated by needle valve assembly 14. The two fluid nozzle has a plurality of hot gas outlet ports 15 (two represented in FIG. 1) having a diameter between 0.125 and 0.375 inches and placed concentrically about orifice 13. The hot gas outlet ports are directed towards the atomizing orifice so as to intersect the polymer solution as it emerges from the nozzle, preferably at least ¼ inch beyond the nozzle. As the polymer solution is forced through outlet 13, it is atomized into fine droplets which in turn are broken up into smaller droplets by the force of the hot gases exiting from outlet ports 15. The hot gas serves two functions. First, it causes further atomization of the droplets. Secondly, it supplies heat to flash solvent from the droplets thus forming discrete, dense particles of polymer that are substantially solvent free. The hot gas used may be any of the inert gases noted above, but preferably is low pressure steam—i.e., about 5 to 150 psig. The gases should be above a temperature of about 212° F.

Figure 2:
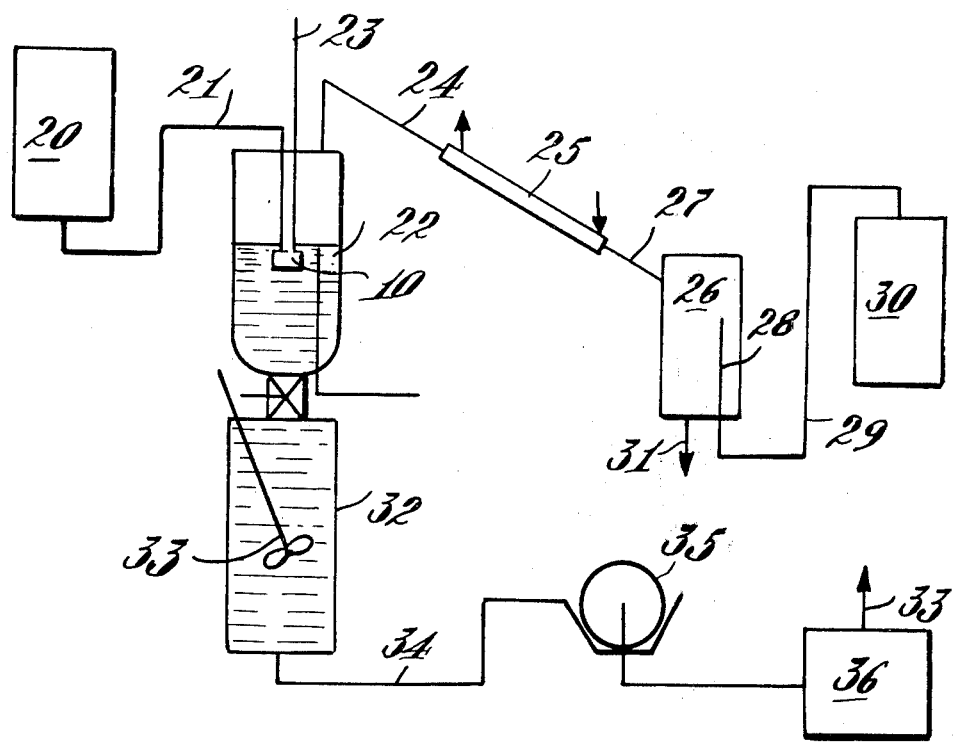
FIG. 2 is a schematic flow diagram showing a polymer recovery system in accordance with one embodiment of the invention.

The invention will be more readily understood by the following specific example illustrating the use of the recovery system depicted in FIG. 2 of the drawings. Feed comprising 5 per cent by weight of a poly-(2,6-diphenyl-1,4-phenylene) ether dissolved in benzene is fed from storage tank 20 through conduit 21 into precipitator 22 and through the central fluid atomizing orifice of the two fluid nozzle 10 depicted in FIG. 1. The feed is pumped through the nozzle at a pressure of 15 psig and at ambient temperature. Pressure can vary from as low as 5 psig to 50 psig or more. Temperature may vary from ambient temperature to a temperature equal to or in excess of the boiling point of the solvent. The feed rate through nozzle 10 is maintained at 10 gallons per hour. This rate can vary dependent upon the size of the system used. Steam at a pressure of 40 psig is fed to nozzle 10 through conduit 23. The nozzle has four outlet ports displaced concentrically around the atomizing orifice for the polymer solution and directed so that the steam intersects and contacts the polymer solution as it emerges from the nozzle. This results in minute droplets of polymer solution that are dried by the steam into fine particles. In the embodiment depicted in FIG. 2 of the drawings, the nozzle 10 is displaced below the surface of hot water. Turbulence caused by the steam entering the hot water maintains the particles of polymer suspended and separated from each other. The temperature of the hot water should be sufficiently high to maintain the solvent flashed from the polymer solution in vapor form so that it rises to the surface of the hot water and passes out of the precipitator 22. With benzene as the solvent, a water temperature of at least 200° F. is required. The temperature of the hot water will be varied according to the solvent used. In general, the hot water should be in excess of the boiling point of the solvent. The solvent vapors pass out of precipitator 22 through conduit 24 and are condensed in conductor 25. From the condenser 25, the solvent in liquid form passes into decantor 26 through conduit 27. The decantor is equipped with weir 28 which effects separation between the benzene and the water. The benzene layer is removed through conduit 29 and finally stored in storage tank 30. The water layer leaves decantor 26 through conduit 31.

It should be understood that the spraying operation need not be conducted below the surface of hot water, but may be conducted above the surface with the particles falling by gravity into a collection means. The collection means may be water contained in the bottom of the precipitator or other means known to those skilled in the art.

The polymer particles fall through the water and into collector tank 32 equipped with agitator 33. The temperature in the collector tank closely approximates that in the precipitator. The particles leave collector tank 32 through conduit 34 and are separated from the water by any suitable means known to those skilled in the art such as centrifuge 35. Finally, the particles are dried, preferably in vacuum oven 36. Water vapors leave the furnace through conduit 37. The dried product of a one hour run was found to be 3.7 pounds. The powder had a bulk density of 0.15 grams/cc.

The procedure described above was repeated six additional times with changes in various variables with results as set forth in the following table:

| Run | Steam (psig) | Benzene[1] (psig) | Benzene[1] lb/hr | Bulk Density (gr/cc) | Handle-ability |
|---|---|---|---|---|---|
| A | 5 | 10 | 19.8 | 0.15 | Excellent |
| B | 20 | 20 | 24.4 | 0.15 | Excellent |
| C | 20 | 30 | 25.9 | 0.15 | Excellent |
| D | 30 | 30 | 19.6 | — | Excellent |
| E | 40 | 20 | 11.5 | 0.15 | Excellent |
| F | 40 | 10 | 19.8 | 0.15 | Excellent |

[1] 5% solution of polymer in solvent

The procedure described above was again repeated substituting nitrogen at 10 psig for steam. The nitrogen temperature was maintained at 400° C. The powder resulting from this process closely resembled the powder resulting from the above described processes but was found to contain approximately 3 percent benzene residues whereas the powder obtained with steam was found to be substantially free of benzene.

Obviously modifications may be made in the above described embodiments without departing from the scope of the invention as defined by the following claims.

I claim:

1. A two fluid nozzle for spray concentrating a polymer solution comprising a first fluid inlet of relatively large diameter for the solution in open communication with an atomizing outlet having a diameter of 0.0625 to 0.125 in. and a second fluid inlet in open communication with at least one outlet port for a second, atomizing fluid, said outlet port having a diameter of 0.125 to 0.375 in. positioned so as to direct a stream of said second fluid into an intersecting path with atomized fine droplets of a polymer solution after they emerge from said atomizing outlet.

2. A two fluid nozzle as defined in claim 1 wherein the outlet port is directed so that the stream of a second fluid intersects the atomized fine droplets of the first fluid at least ¼ inch beyond the two fluid nozzle.

* * * * *